United States Patent
Iwamoto et al.

(10) Patent No.: US 8,293,364 B2
(45) Date of Patent: Oct. 23, 2012

(54) HIGHLY SHRINKABLE FIBER

(75) Inventors: Hayato Iwamoto, Fukuoka (JP); Yoshitomo Hara, Fukui (JP); Hideo Ueda, Fukui (JP); Masaharu Saito, Fukui (JP)

(73) Assignee: KB Seiren, Ltd., Fukui (JP)

( * ) Notice: Subject to any disclaimer, the term of this patent is extended or adjusted under 35 U.S.C. 154(b) by 150 days.

(21) Appl. No.: 12/596,160

(22) PCT Filed: Apr. 18, 2007

(86) PCT No.: PCT/JP2007/058471
§ 371 (c)(1),
(2), (4) Date: Nov. 2, 2009

(87) PCT Pub. No.: WO2008/129678
PCT Pub. Date: Oct. 30, 2008

(65) Prior Publication Data
US 2010/0137527 A1 Jun. 3, 2010

(51) Int. Cl.
*D01F 6/60* (2006.01)
*D01F 6/90* (2006.01)
*C08L 77/00* (2006.01)

(52) U.S. Cl. ........ 428/357; 428/364; 428/365; 428/373; 428/374; 525/420; 525/432

(58) Field of Classification Search .............. 428/357, 428/364, 365, 373, 374; 525/420, 432
See application file for complete search history.

(56) References Cited

FOREIGN PATENT DOCUMENTS

| GB | 1143983 | * | 2/1996 |
|---|---|---|---|
| JP | 03-064516 | | 3/1991 |
| JP | 04-289225 | * | 10/1992 |
| JP | 05-044109 | | 2/1993 |
| JP | 06-287807 | | 10/1994 |
| JP | 08-209444 | | 8/1996 |
| JP | 09-241924 | | 9/1997 |
| JP | 2000-154426 | | 6/2000 |
| JP | 2007-100270 | | 4/2007 |

OTHER PUBLICATIONS

Derwent—ACC-No. 1968-96929P, Thermally stable conjugated fibres (JP 67025497B).*

* cited by examiner

*Primary Examiner* — Ana Woodward
(74) *Attorney, Agent, or Firm* — Kirschstein, et al.

(57) ABSTRACT

A highly shrinkable fiber composed of nylon-MXD6 polymer and nylon-6 polymer, characterized in that a weight ratio therebetween is in the range of 35:65 to 70:30, and that each thereof exhibits a breaking strength of 4.00 cN/dtex or greater. Preferably, the weight ratio between nylon-MXD6 polymer and nylon-6 polymer of the highly shrinkable fiber is in the range of 45.55 to 55:45. The highly shrinkable fiber exhibits a high shrinkage ratio in boiling water, so that when the highly shrinkable fiber is used in a woven fabric, there can be realized a high density.

4 Claims, No Drawings

HIGHLY SHRINKABLE FIBER

TECHNICAL FIELD

The present invention relates to a highly shrinkable fiber that is high in shrink performance and that can provide a high density when being used as a woven fabric.

BACKGROUND ART

In recent years, fibers that exhibit high shrink performance by means of heat treatment have been demanded in the development of high density woven fabrics. If a woven fabric produced by weaving such a highly shrinkable fiber is subjected to heat treatment, highly shrinkable fibers shrink, so that gaps between warps and wefts are reduced. As a result, a high density woven fabric that is appropriate in springiness, firmness, repellency and the like can be obtained.

Although highly shrinkable polyester filaments are used as such highly shrinkable fibers, they feel somewhat hard after being shrunk and therefore are problematic in comfortableness in clothing applications.

JP H03-64516 A discloses a highly shrinkable nylon fiber having a boiling water shrinkage of 15% or more. However, this fiber is designed for being fabricated into heterogeneously shrinkable combined filament yarn by being intermingled with another fiber. Therefore, if a woven fabric produced by weaving that fiber is subjected to heat treatment, it is not shrunk sufficiently due to its small shrinkage stress and a woven fabric having a high density could not be obtained.

JP H08-209444 A discloses a highly shrinkable nylon fiber having a boiling water shrinkage of 30% or more. However, since the polymer to be used for producing this fiber was produced by copolymerization, there have been a problem that the production of the copolymer requires time and labor and the cost becomes high.

Patent document 1: JP H03-64516 A
Patent document 2: JP H08-209444 A

DISCLOSURE OF THE INVENTION

Problems to be Solved by the Invention

The present invention was made in order to solve drawbacks of such conventional techniques and an object thereof is to provide a highly shrinkable fiber, which has a high boiling water shrinkage and can provide a high density when being used as a woven fabric.

Means for Solving the Problem

In order to achieve the aforementioned object, a first gist of the present invention is a highly shrinkable fiber comprising a nylon MXD6 polymer and a nylon 6 polymer, wherein the weight ratio thereof is from 35:65 to 70:30 and the breaking strength is 4.00 cN/dtex or more. The nylon MXD6 as referred to herein is a crystalline polyamide obtained from a polymerization reaction of metaxylenediamine and adipic acid.

One of the preferable embodiments of the present invention is the above-mentioned highly shrinkable fiber wherein the weight ratios of the nylon MXD6 polymer of the nylon 6 polymer is 45:55 to 55:45.

Effects of the Invention

The highly shrinkable fiber of the present invention exhibits high shrink performance due to the fact that the nylon MXD6 polymer and the nylon 6 polymer have been mixed in a weight ratio of 35:65 to 70:30. In addition, it is good in weavability and has high tear strength as a woven fabric because it has moderate strength. Moreover, it has good feeling that highly dense polyester woven fabrics fail to have.

Furthermore, since not copolymerization but a mixture of polymers is used, the need for a copolymerization step is eliminated and time and labor or cost for copolymerization can be saved.

Among the highly shrinkable fibers of the present invention, a fiber in which weight ratio of nylon MXD6 polymer to nylon 6 polymer is 45:55 to 55:45 is particularly high in boiling water shrinkage and makes it possible to give a woven fabric higher in density when weaving a highly shrinkable fiber and then applying a shrink process.

BEST MODE FOR CARRYING OUT THE INVENTION

The present invention will be further described hereinafter.

The polymer mixture to be used for the present invention must be a mixture prepared by mixing a nylon MXD6 polymer and a nylon 6 polymer in a weight ratio of 35:65 to 70:30. A highly shrinkable fiber can be obtained by using the mixture as a raw material. If the nylon MXD6 polymer is present at a proportion of less than 35% by weight or more than 70% by weight, fibers high in boiling water shrinkage cannot be obtained.

It is particularly desirable that the polymer mixture to be used for the present invention has a weight ratio of the nylon MXD6 polymer to the nylon 6 polymer of from 45:55 to 55:45. If the weight ratio is from 45:55 to 55:45, the boiling water shrinkage (%) is particularly great and, therefore, a denser woven fabric can be obtained.

From the viewpoint of the stability of melt spinning operation, the nylon 6 polymer preferably has a relative viscosity of 2.2 or more. The relative viscosity is more preferably 2.4 or more, and particularly preferably 2.7 or more. Although the upper limit of the relative viscosity is not particularly limited, 3.5 is high enough from the viewpoint of the stability of melt spinning operation.

From the viewpoint of the stability of melt spinning operational efficiency, the nylon MXD6 polymer preferably has a relative viscosity of 2.1 or more. The relative viscosity is more preferably 2.3 or more, and particularly preferably 2.5 or more. Although the upper limit of the relative viscosity is not particularly limited, 3.3 is high enough from the viewpoint of the stability of melt spinning operation.

The moisture regains (ppm) of the nylon 6 polymer and the nylon MXD6 polymer are not particularly limited and may be determined appropriately. In view of spinning operational efficiency, the nylon 6 polymer and the nylon MXD6 to be used preferably have each a moisture regain of 500 ppm or less, more preferably 300 ppm or less, and particularly preferably 200 ppm or less.

In order to improve the spinning operational efficiency, it is desirable to allow the polymers to contain inorganic particles. Many kinds of inorganic particles can be used for this purpose and examples thereof include titanium oxide, zinc oxide, magnesium carbonate, silicon oxide, calcium carbonate, alumina and the like. While the inorganic particles to be added are not particularly restricted unless the spinning operational efficiency is impaired, it is desirable, from the viewpoints of dispersibility and cost performance, to use titanium oxide. It is desirable to add inorganic particles in an amount of 0.1% by weight to 3.0% by weight, and particularly desirably 0.3% by weight to 1.0% by weight relative to the yarn weight.

In the case of using the aforementioned inorganic particles, the mean particle diameter of the powder or particles is preferably 0.01 μm to 10 μm, and particularly preferably 0.05 μm to 2 μm. If the mean particle diameter is within such ranges, aggregation of particles occurs less frequently and, therefore, the occurrence of yarn evenness tends to be inhibited and stabilized strength can be obtained.

The mixing method of the nylon 6 polymer and the nylon MXD6 polymer is not particularly restricted. For example, chips of the nylon 6 polymer and chips of the nylon MXD6 polymer may be mixed in a container or kneaded.

The spinning method and the draw-twisting method to be used for obtaining the highly shrinkable fiber of the present invention (hereinafter, referred to as the invented fiber) are not particularly restricted. Draw-twisting after spinning by a conventional system, drawing immediately after spinning, or the like may be determined appropriately. The drawing method is not particularly restricted, and one-step drawing, multistep drawing, or the like may be determined appropriately.

Spinning conditions may be determined appropriately from the viewpoint of the relative viscosities of the polymers or the operational efficiency. The following example is introduced as one example. A polymer mixture is prepared by mixing a nylon 6 polymer having a relative viscosity of 3.0 and a nylon MXD6 polymer having a relative viscosity of 2.7. The polymer mixture is then melt-spun by a conventional method to obtain an undrawn yarn. In this case, the extrusion temperature (° C.) is preferably from 280° C. to 295° C., and particularly preferably from 283° C. to 292° C. The spinning winding-up rate (m/min) is preferably from 500 m/min to 2000 m/min, and particularly preferably from 800 m/min to 1700 m/min.

The draw-twisting conditions used after spinning by the conventional method are not particularly restricted. One-step drawing, multistep drawing, roller heater/roller heater drawing, roller heater/plate heater drawing, or the like may be determined appropriately.

For example, in the case of draw-twisting the undrawn yarn obtained through melt-spinning by the conventional method, if a roller heater and a plate heater are used, the temperature of the roller heater is preferably from 60° C. to 90° C., and particularly preferably from 70° C. to 85° C. The temperature of the plate heater is preferably from 130° C. to 170° C., and particularly preferably from 145° C. to 160° C.

It is desirable to determine the draw ratio according to the spinning rate (m/min). Determination of a spinning rate and a draw ratio in good balance makes it possible to adjust the strength and the degree of elongation of the resulting fiber and, as a result, to obtain a fiber that is excellent in weavability. For example, when the spinning rate is adjusted at 1500 m/min, the draw ratio is preferably adjusted at 2.0 times to 2.4 times, and particularly preferably 2.1 times to 2.3 times.

From the viewpoint of operational efficiency, the drawing rate (m/min) is preferably 500 m/min to 1000 m/min, and particularly preferably 600 m/min to 900 m/min. The spindle rotation speed (rpm) is preferably adjusted at a value that corresponds to the drawing rate. Appropriate determination of a spindle rotation speed balanced with a drawing rate results in a proper number of twist, so that good operational efficiency and good shrink performance can be obtained. The spindle rotation speed (rpm) is preferably adjusted at a rotation speed (rpm) as high as 8 times to 12 times the drawing rate (m/min).

The fineness (dtex) of the invented fiber is not particularly limited and it may be determined appropriately as far as the fiber can be spun. In the production of a highly dense woven fabric, the total fineness of a warp and a weft is preferably 30 dtex to 300 dtex. It is more preferably 40 dtex to 200 dtex, and particularly preferably 50 dtex to 150 dtex. If the fineness is excessively low, the shrink performance as yarns may be low. Therefore, a fineness at which shrinkage occurs to a sufficient degree is preferably applied.

The single yarn fineness (dtex) and the number of filaments of the invented fiber are not particularly limited and may be determined appropriately as far as the fiber can be spun. Although either a multifilament or a monofilament may be determined, a multifilament is preferred when being as a highly shrinkage woven fabric because high denseness can be obtained. The single yarn fineness in a multifilament is preferably 1 dtex to 6 dtex, and particularly preferably 2 dtex to 4 dtex.

The sectional shape of the invented fiber is not particularly restricted. From the viewpoint of spinning operation efficiency, it is preferably a circular cross section.

The invented fiber must have a breaking strength (cN/dtex) of 4.00 cN/dtex or more. It is more preferably 4.30 cN/dtex or more, and particularly preferably 4.60 cN/dtex or more. Due to the fact that the fiber strength is high, it becomes possible to weave the fiber at high density without causing yarn breakage. If the breaking strength is less than 4.00 cN/dtex, an attempt to weave the fiber at high density results in yarn breakage and, therefore, good weavability cannot be obtained.

The elongation at break (%) of the invented fiber is preferably 25% to 55%. It is more preferably 25% to 45%, and particularly preferably 30% to 40%. Such an elongation at break results in good weaving operational efficiency.

The heat shrinkage stress (cN/dtex) of the invented fiber is preferably 0.15 cN/dtex or more. It is more preferably 0.20 cN/dtex or more, and particularly preferably 0.25 cN/dtex or more. If the heat shrinkage stress is within the above-mentioned range, it is possible to obtain a denser woven fabric by shrinking the fiber at a higher shrinkage stress during the shrink process.

One example of the method for obtaining a high density woven fabric by using the invented fiber is introduced below.

The weaving method and the weaving structure used in weaving the invented fiber are not particularly restricted, and they may be determined appropriately from the viewpoint of weavability and design.

The method of shrink processing a woven fabric is not particularly restricted and may be determined appropriately. It is desirable to immerse a gray fabric after weaving in hot water while applying fixed tension. At this time, it is preferable that the fabric is subjected to shrink process at a hot water temperature of 90° C. to 100° C., an immersion time of 5 minutes to 30 minutes while applying a tension of 0.05 cN/dtex to 0.20 cN/dtex in the lateral direction and the longitudinal direction, respectively.

As to the tear strength (N) of a high density woven fabric after shrink processing, it is preferable that the tear strength in the warp cutting direction is 20 N or more and the tear strength in the weft cutting direction is 15 N or more, and it is particularly preferable that the tear strength in the warp cutting direction is 25 N or more and the tear strength in the weft cutting direction is 20 N or more. If the tear strength is high, a dense woven fabric that is high in durability even after shrink processing can be obtained.

EXAMPLES

The present invention is described below in more detail with reference to Examples. However, the present invention is not limited to the following Examples.

A. Measurement of Relative Viscosity

The measurement of relative viscosity is performed by the use of an automatic viscosity analyzer (model SS-600-L1) manufactured by Shibayama Scientific Co., Ltd. A polymer is dissolved at a concentration of 1 g/dl by using 95.8% concentrated sulfuric acid for a solvent, and the measurement is performed at 25° C. in a thermostatic bath.

B. Measurement of Breaking Strength and Elongation at Break

The measurement is performed by using Autograph AGS-1KNG tensile tester manufactured by Shimadzu Corporation, under conditions including a sample yarn length of 20 cm and a fixed tensile rate of 20 cm/min according to JIS L-1013. The value obtained by dividing the maximum load in a load-elongation curve by the fineness is defined as a breaking strength (cN/dtex) and the elongation percentage at that time is defined as an elongation at break (%).

C. Calculation of Boiling Water Shrinkage

The calculation method of boiling water shrinkage is as follows. First, a fiber is folded and a weight of 0.2 g is hung on the folded position. The fiber is allowed to stand for 10 minutes at room temperature and measuring the fiber length. Then the fiber is immersed in boiling water for 20 minutes. The fiber taken out of the boiling water was allowed to stand at room temperature for 10 minutes and then the fiber length after shrinkage is measured. The boiling water shrinkage $\Delta w$ is calculated by the following formula.

$$\Delta w = [(L0-L1)/L0] \times 100\ (\%)$$

L0: Fiber length before shrinkage at a load of 0.2 g
L1: Fiber length after shrinkage at a load of 0.2 g D. Measurement of Heat Shrinkage Stress Heat shrinkage stress is measured by using a shrinkage stress analyzer, model KE-II manufactured by Kanebo Engineering Co., Ltd. A heat shrinkage force that is exhibited by a sample yarn tied at both ends into a loop with a 5-cm circumference is measured when an initial load of (fineness)×2/30 (cN) is applied and the sample is then heated from room temperature at a rate of 120° C./min. The maximum of the measured heat shrinkage force is defined as the peak (cN) of the heat shrinkage force and the temperature at the peak is defined as the heat shrinkage force peak temperature (° C.). Then a value obtained by dividing the maximum value of the heat shrinkage force by twice the fiber fineness is defined as a heat shrinkage stress (cN/dtex).

E. Evaluation of Weavability

A woven fabric with plain weave tissue is produced by using a weaving machine manufactured by SULZER at a rotation speed of 300 rpm and then the weave length is measured when the machine just has become impossible to maintain normal weaving due to the occurrence of fluffing or yarn breakage. It is implied that the longer the weave length is, the better the weavability is. A sample having a weave length of 500 m or more is judged to be good in weavability and a sample having a weave length of less than 500 m is judged to be poor in weavability.

F. Cover Factor

The cover factor is defined by the following formula:

$$\{\text{Total fineness (dtex) of yarn}\}^{1/2} \times \{\text{density of woven fabric (yarns/2.54 cm)}\}$$

and is expressed by the sum total of the cover factors determined for the warps and the wefts, respectively. The fact that the cover factor is great means that yarns occupy a great area in the area of the woven fabric and implies that the woven fabric is high in denseness.

G. Shrink Performance Evaluation (Cover Factor Change)

The shrink performance of a woven fabric is evaluated on the basis of cover factor change. The cover factor change is expressed by the following formula:

CF1−CF0

CF0: Cover factor before shrink processing
CF1: Cover factor after shrink processing under a fixed tension of 0.10 cN/dtex in the lateral direction and in the longitudinal direction, respectively.

The fact that the cover factor change is great means that the woven fabric has shrunk greatly through the shrink processing and is implies that the fabric is of high shrink performance. A sample having a cover factor change of 400 or more is judged to be of good shrink performance and a sample having a cover factor change of less than 400 is judged to be poor in shrink performance.

H. Measurement and Evaluation of Tear Strength of a Woven Fabric After Shrink Processing In accordance with A-1 method (Single tongue method) provided in JIS L-1096, a 5 cm×25 cm specimen is cut at the center of one shorter side, 10 cm perpendicularly to the side, and then the tear strength (N) in the warp cutting direction and the tear strength (N) in the weft cutting direction after shrink processing are measured at a tensile rate of 10 cm/min by the use of a tensile strength analyzer manufactured by ORIENTEC Co., Ltd.

If the tear strength in the warp cutting direction is 20 N or more and the tear strength in the weft cutting direction is 15 N or more, it is judged that the tear strength is good. If the tear strength in the wart cutting direction is less than 20 N and the tear strength in the weft cutting direction is less than 15 N, it is judged that the tear strength is not good.

Example 1

Chips of a nylon 6 polymer having a relative viscosity of 3.0 and chips of a nylon MXD6 polymer having a relative viscosity of 2.7, each of the polymers containing 0.4% by weight of titanium oxide, were vacuum dried. The moisture regain after drying of the nylon 6 polymer was 130 ppm and that of the nylon MXD6 polymer was 80 ppm.

Both the polymers were charged in a weight ratio of 50:50 into one bag and were mixed uniformly. The resulting mixture was melt-spun at a spinning temperature of 290° C. and a spinning rate of 1500 m/min with a spinneret having 24 holes to obtain undrawn yarns.

Then, the undrawn yarns were subjected to draw-twisting at a drawing rate of 800 m/min, a spindle rotation speed of 800 rpm, a roller heater temperature of 85° C., a plate heater temperature of 150° C., and a draw ratio of 2.2 to obtain drawn yarns. Measurements of the properties of the drawn yarns revealed that the fineness was 82.9 dtex, the strength was 4.45 cN/dtex, the degree of elongation was 35.3%, and the boiling water shrinkage was 52.7%.

Weaving was performed at a rotation speed of 300 rpm using the above-mentioned drawn yarns as wefts and 24-filament homopolyethylene terephthalate fibers having a fineness of 83.4 dtex as warps, producing a gray fabric with a plain weave tissue. The gray fabric had a warp density of 106 yarns/2.54 cm, a weft density of 94 yarns/2.54 cm, and a weave length of 896 m.

The gray fabric was immersed in hot water at 97° C. for 20 minutes under a fixed tension of 0.10 cN/dtex applied in the lateral direction and in the longitudinal direction, respectively, thereby being subjected to shrink processing. A woven product was thereby obtained. Measurement of the fabric density after the shrink processing revealed that the warp density was 134 yarns/2.54 cm, and the weft density was 101 yarns/2.54 cm. Measurement of the tear strength after the shrink processing revealed that the tear strength (N) in the warp cutting direction was 23.2 N and the tear strength (N) in the weft cutting direction was 17.2N. Moreover, the fabric had softness and was moderate in springiness and firmness, so that it had good feeling.

<Boiling Water Shrink Performance Evaluation Based on Difference in Mix Ratio of Nylon 6 and Nylon MXD6>

Examples 2 and 3, Comparative Examples 1 to 4

Various evaluations were carried out for fibers obtained by performing melt-spinning and draw-twisting in accordance with the procedures disclosed in Example 1 except for changing the mix ratio of the nylon 6 polymer and the nylon MXD6 polymer. The results are set forth in Table 1.

TABLE 1

|  | Comparative Example 1 | Comparative Example 2 | Example 2 | Example 1 | Example 3 | Comparative Example 3 | Comparative Example 4 |
|---|---|---|---|---|---|---|---|
| Nylon MXD6 (% by weight) | 0 | 30 | 40 | 50 | 65 | 80 | 100 |
| Nylon 6 (% by weight) | 100 | 70 | 60 | 50 | 35 | 20 | 0 |
| Fineness (dtex) | 82.3 | 84.4 | 83.1 | 82.9 | 82.8 | 81.9 | 82.2 |
| Breaking strength (cN/dtex) | 4.86 | 4.65 | 4.42 | 4.45 | 4.22 | 4.10 | 4.01 |
| Elongation at break (%) | 33.4 | 33.3 | 32.3 | 35.3 | 31.1 | 33.2 | 30.8 |
| Heat shrinkage stress (cN/dtex) | 0.21 | 0.22 | 0.22 | 0.23 | 0.21 | 0.20 | 0.22 |
| Boiling water shrinkage (%) | 15.2 | 39.3 | 46.5 | 52.7 | 43.3 | 29.0 | 15.3 |
| Cover factor before shrinkage | 1810 | 1834 | 1829 | 1823 | 1811 | 1810 | 1822 |
| Cover factor after shrink process | 1912 | 2113 | 2299 | 2370 | 2262 | 2034 | 1919 |
| Shrink performance (cover factor increase) | 102 | 279 | 470 | 547 | 451 | 224 | 197 |

In Comparative Examples 1 and 2, the mix ratio of the nylon MXD6 polymer was excessively small and, as a result, the boiling water shrinkage was poor. In association with this, the shrink performance was also low and no dense woven fabric could be obtained. In Comparative Examples 3 and 4, since the mix ratio of the nylon MXD6 polymer was excessively great, the shrink performance was poor and, as a result, no dense woven fabric could be obtained. On the other hand, in Examples 1 to 3, which are in accordance with the present invention, the boiling water shrinkage was good and the shrink performance was high, so that a dense woven fabric was successfully obtained. Moreover, the fabric had softness and was moderate in springiness and firmness, so that it had good feeling.

<Weaving Performance Evaluation Based on Difference in Fiber Strength>

Examples 4 and 5, Comparative Examples 5 and 6

A fiber was produced in the procedures disclosed in Example 1 except for changing the fiber strength by changing the relative viscosity and then weaving performance evaluation and evaluation of tear strength after shrink processing were carried out. The results are shown in Table 2.

TABLE 2

|  |  | Comparative Example 5 | Comparative Example 6 | Example 4 | Example 5 |
|---|---|---|---|---|---|
| Fiber strength before shrinkage (cN/dtex) |  | 3.35 | 3.51 | 4.32 | 4.66 |
| Elongation at break (%) |  | 33.9 | 31.9 | 35.2 | 33.9 |
| Relative viscosity | Nylon 6 | 2.1 | 2.7 | 2.7 | 2.9 |
|  | Nylon MXD6 | 2.4 | 2.0 | 2.3 | 2.7 |
| Weaving length (m) |  | 244 | 306 | 789 | 1050 |
| Tear strength | Warp cutting direction | 21.2 | 22.8 | 22.1 | 22.4 |

TABLE 2-continued

|  |  | Comparative Example 5 | Comparative Example 6 | Example 4 | Example 5 |
|---|---|---|---|---|---|
| (N) | Weft cutting direction | 13.5 | 14.3 | 15.4 | 18.5 |

In Comparative Examples 5 and 6, since the fiber strength was low, the weavability was poor. On the other hand, Examples 4 and 5, which are in accordance with the present invention, good weavability could be obtained because of possession of sufficient strength. In addition, the tear strength after shrink processing was good.

Industrial Applicability

As described above, the highly shrinkable fiber of the present invention has characteristics, such as high boiling water shrinkage and high shrink performance and therefore is suitable for use for highly shrinkable woven fabrics.

The invention claimed is:

1. A highly shrinkable multifilament fiber comprising: a plurality of filaments, each filament including a uniform mixture of a nylon MXD6 polymer and a nylon 6 polymer, each filament having a weight ratio of the nylon MXD6 polymer to the nylon 6 polymer of from 35:65 to 70:30, the fiber having a breaking strength (cN/dtex) of 4.00 cN/dtex or more, and the fiber being woven into a high density woven fabric that, after shrinking, has a tear strength in a warp cutting direction of 20 N or more, and a tear strength in a weft direction of 15N or more.

2. The highly shrinkable multifilament fiber of claim 1, wherein the weight ratio of the nylon MXD6 polymer to the nylon 6 polymer is from 45:55 to 55:45.

3. The highly shrinkable multifilament fiber of claim 1, wherein the fiber has a boiling water shrinkage of 43.3% or more.

4. The highly shrinkable multifilament fiber of claim 1, wherein each filament has a fineness of 1 dtex to 6 dtex.

* * * * *